US 11,512,980 B2

(12) United States Patent
Choi et al.

(10) Patent No.: US 11,512,980 B2
(45) Date of Patent: Nov. 29, 2022

(54) ABSOLUTE POSITION DETECTION DEVICE AND DETECTION METHOD OF ROTATING BODY

(71) Applicant: KOREA ELECTRONICS TECHNOLOGY INSTITUTE, Seongnam-si (KR)

(72) Inventors: Jun Hyuk Choi, Bucheon-si (KR); Joon Sung Park, Seoul (KR); Jin Hong Kim, Suwon-si (KR); Byong Jo Hyon, Anyang-si (KR); Yong Su Noh, Seoul (KR); Dong Myoung Joo, Bucheon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/136,624

(22) Filed: Dec. 29, 2020

(65) Prior Publication Data

US 2022/0018684 A1 Jan. 20, 2022

(30) Foreign Application Priority Data

Jul. 16, 2020 (KR) ........................ 10-2020-0087939

(51) Int. Cl.
*G01D 5/14* (2006.01)
(52) U.S. Cl.
CPC .................................. *G01D 5/145* (2013.01)
(58) Field of Classification Search
CPC .................................................... G01D 5/145
See application file for complete search history.

(56) References Cited

U.S. PATENT DOCUMENTS

2013/0179117 A1   7/2013   Delbaere
2017/0322014 A1*  11/2017  Jeon ........................ G01P 3/44

FOREIGN PATENT DOCUMENTS

JP         2011-252826 A     12/2011
KR         2013-0094953 A    8/2013
KR         10-2014-0138253 A 12/2014

OTHER PUBLICATIONS

Office Action dated Nov. 30, 2021 in Korean Application No. 10-2020-0087939.

(Continued)

*Primary Examiner* — Clayton E. LaBalle
*Assistant Examiner* — Michael A Harrison
(74) *Attorney, Agent, or Firm* — Knobbe Martens Olson & Bear LLP

(57) ABSTRACT

This application relates to an absolute position detection device and detection method of a rotating body. In one aspect, the device includes first row magnets coupled to a rotating body to rotate together and having n pole pairs, and second row magnets coupled to the rotating body to rotate together and having (n+1) pole pairs. The device also includes a first Hall sensor installed adjacent to the first row magnets and configured to detect a change in magnetism according to rotation of the first row magnets. The device further includes a second Hall sensor installed adjacent to the second row magnets and configured to detect a change in magnetism according to rotation of the second row magnets. The device further includes a controller configured to measure an absolute position of the rotating body using signals output from the first and second Hall sensors.

7 Claims, 5 Drawing Sheets

(56) References Cited

OTHER PUBLICATIONS

U.S. Office Action issued for U.S. Appl. No. 17/136,931, dated Jul. 6, 2022.
Korean Office Action issued for Application No. 10-2020-0087942, dated Jun. 29, 2022.

* cited by examiner

ABSOLUTE POSITION DETECTION DEVICE AND DETECTION METHOD OF ROTATING BODY

CROSS-REFERENCE TO RELATED APPLICATIONS

This application claims priority under 35 U.S.C § 119 to Korean Patent Application No. 10-2020-0087939, filed on Jul. 16, 2020, in the Korean Intellectual Property Office, the disclosure of which is incorporated herein by reference in its entirety.

BACKGROUND

Technical Field

The following disclosure relates to a detection device and a detection method capable of detecting an absolute position of a rotating body, and more particularly, to a device and method capable of detecting an absolute position of a rotating body such as a motor or a vehicle wheel using a plurality of rows of magnets.

Description of Related Technology

An encoder refers to a sensor that electrically outputs information on a position and a speed of an object that makes a rotational motion or a linear motion. Among types of encoders, an encoder that electrically outputs information on a position or a speed of an object that makes a rotational motion is called a rotary encoder, and encoders may be classified as optical encoders and magnetic encoders according to detection sensors.

Meanwhile, a wheel bearing is a key component that fixes a wheel of a vehicle and minimizes friction loss to enable smooth rotation and supports a weight of the vehicle. The encoder is a key component of an anti-lock brake system (ABS) used in the wheel bearing and generates a square wave speed signal in an ABS ECU to provide signal information such as a rotation speed, rotation acceleration, and the like of a tire.

SUMMARY

An exemplary embodiment of the present disclosure is directed to providing an absolute position detection device and detection method of a rotating body, capable of detecting an absolute position so as to be applied to various fields.

In one general aspect, an absolute position detection device of a rotating body includes, first row magnets coupled to a rotating body to rotate together and having n pole pairs, second row magnets coupled to the rotating body to rotate together and having n+1 pole pairs (n is a natural number): a first Hall sensor installed adjacent to the first row magnets, detecting a change in magnetism according to rotation of the first row magnet, and outputting a signal; a second Hall sensor installed adjacent to the second row magnets, detecting a change in magnetism according to rotation of the second row magnets, and outputting a signal; and a controller measuring an absolute position of the rotating body using the signals output from the first Hall sensor and the second Hall sensor.

The controller may detect a primary harmonic using a value of the signal output from the first Hall sensor at every predetermined period of the signal output from the second Hall sensor and measure an absolute position of the rotating body according to a value of the primary harmonic.

The controller may estimate the primary harmonic using at least two of the values of the signal output from the first Hall sensor at every predetermined period of the signal output from the second Hall sensor to measure the absolute position of the rotating body.

The detection device may further include third row magnets coupled to the rotating body to rotate together and having n+2 pole pairs (n is a natural number); and a third Hall sensor installed adjacent to the third raw magnets and detecting a change in magnetism according to rotation of the third row magnets, wherein the controller measures the absolute position using signals detected by at least two Hall sensors among the first Hall sensor, the second Hall sensor, and the third Hall sensor.

The controller may measure the absolute position of the rotating body by detecting a primary harmonic using a value of the signal output from the first Hall sensor at every predetermined period of the signal output from the second fall sensor and a value of the signal output from the second Hall sensor at every predetermined period of the signal output from the third Hall sensor.

The first row magnets and the second row, magnets may be arranged adjacent to each other in a direction of a rotation axis of the rotating body.

The first row magnets and the second row magnets may be arranged in an outer circumferential direction about a rotation axis of the rotating body.

In another general aspect, an absolute position detection method of a rotating body using first row magnets and second row magnets coupled to a rotating body and rotating, includes: a) detecting, by a first Hall sensor, a change in magnetism according to rotation of the first row magnets having n pole pairs and outputting a signal and detecting, by a second Hall sensor, a change in magnetism according to rotation of the second row magnets having n+1 pole pairs and outputting a signal; b) measuring an absolute position of the rotating body by detecting a primary harmonic using a value of the signal output from the first Hall sensor at every predetermined period of the signal output from the second Hall sensor.

In b), the absolute position of the rotating body may be measured by estimating the primary harmonic using at least two of the values of the signal output from the first Hall sensor at every predetermined period of the signal output from the second Hall sensor.

In another general aspect, an absolute position detection method of a rotating body using first row magnets, second row magnets, and third row magnets coupled to a rotating body and rotating includes: a) detecting, by a first Hall sensor, a change in magnetism according to rotation of the first row magnets having n pole pairs and outputting a signal, detecting, by a second Hall sensor, a change in magnetism according to rotation of the second row magnets having n+1 pole pairs and outputting a signal, and detecting, by a third Hall sensor, a change in magnetism according to rotation of the third row magnets having n+2 pole pairs and outputting a signal; b) measuring an absolute position of the rotating body by detecting a primary harmonic using a value of the signal output from the first Hall sensor at every predetermined period of a signal output from the second Hall sensor or by detecting a primary harmonic using a value of the signal output from the second Hall sensor at every predetermined period of the signal output from the third Hall sensor.

Other features and aspects will be apparent from the following detailed description, the drawings, and the claims.

DETAILED DESCRIPTION

Figure 1:
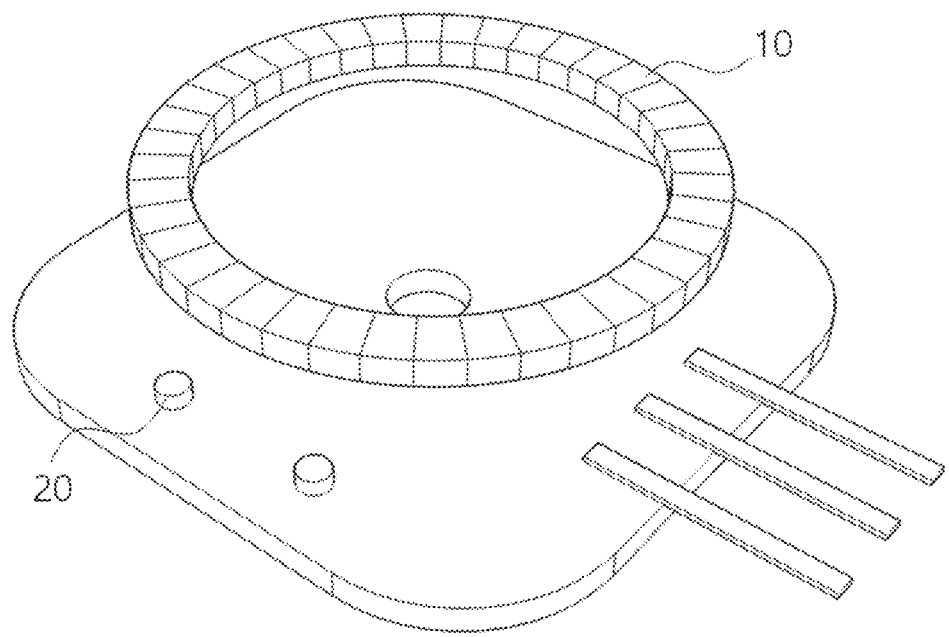
FIG. 1 is an exploded perspective view of a magnetic encoder.

FIG. 1 shows a magnetic encoder applied to a general wheel bearing. As shown in FIG. 1, the magnetic encoder may include a magnet 10 coupled to a rotation axis and rotating together with a rotating body (e.g., wheel) and a rotation detection unit 20 installed adjacent to the magnet 10 and detecting a change in magnetism according to rotation of the magnet 10.

The magnet 10 shown in FIG. 1 includes a plurality of N poles and S poles that are repeatedly and alternately arranged, and the rotation detection unit 20 includes a Hall sensor but does not rotate unlike the magnet 10, detects a change of magnetism by the rotating magnet 10 and provides information such as a rotation direction and a rotation speed of the rotating body. A modified magnetic encoder in which multi-pole magnets are configured in two rows to increase resolution has also been introduced, but with the method, it is not possible to detect an absolute position of the rotating body, leading to a problem of a limited application of an application field.

Hereinafter, exemplary embodiments of an absolute position detection device of a rotating body according to the present disclosure will be described in detail with reference to the accompanying drawings.

First Embodiment

Figure 2:
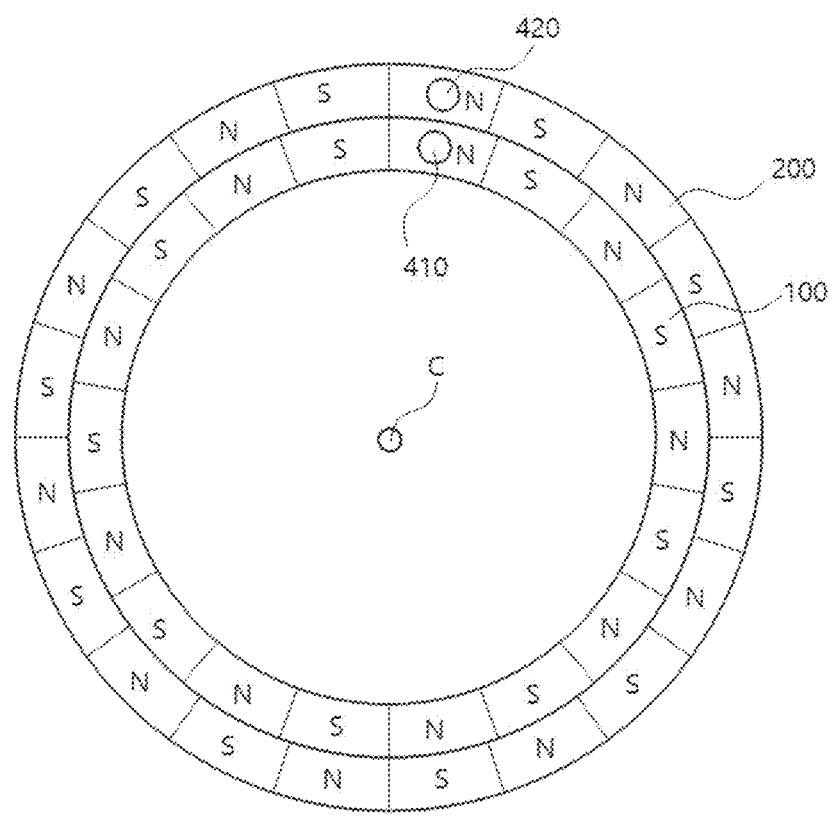
FIG. 2 is a schematic diagram of an absolute position detection device of a rotating body according to a first exemplary embodiment of the present disclosure.

FIG. 2 schematically shows an absolute position detection device of a rotating body according to a first exemplary embodiment of the present disclosure.

The absolute position detection device of a rotating body according to the first exemplary embodiment of the present disclosure may be applied to a wheel bearing of a vehicle or the like as described in the background art, and the rotating body described below may be various types of rotating devices including wheels of a vehicle.

As shown in FIG. 2, the absolute position detection device of a rotating body according to the first exemplary embodiment of the present disclosure may include first row magnets 100, second row magnets 200, a first hall sensor 410, and a second Hall sensor 420.

As shown in FIG. 2, the first row magnets 100 rotate about a rotation axis C and have n pole pairs (n is a natural number). Specifically, in this exemplary embodiment, the first row magnets 100 are arranged such that N-pole and S-pole magnets are alternately arranged along an imaginary circumference centered on the rotation axis C. In the first row magnets 100, a pair of one N pole magnet and one S pole magnet disposed adjacent to the corresponding N pole magnet is referred to as one polar pair. In a general encoder, magnets coupled to a rotating body may have 24 pole pairs, i.e., 48 poles, and the first row magnets 100 of the present disclosure may also have 24 pole pairs, and in this disclosure, for convenience of description, it is assumed that the first row magnets 100 have 9 pole pairs.

As shown in FIG. 2, the second row magnets 200 also rotate about the rotation axis C and have n+1 pole pairs (n is a natural number). That is, the second row magnets 200 have one more pole pair than the first row magnets 100. The second row magnets 200 may be arranged outside an outer circumferential direction of the first row magnets 100 around the rotation axis C. In general, when magnets are arranged in two rows in a magnetic encoder to increase resolution, both rows have the same number of pole pairs. However, in the present disclosure, by making the pole pairs of the first row magnets 100 and the second row magnets 200 different, the pole pairs of the first row magnets 100 and the second row magnets 200 are used to measure an absolute position of the rotating body. When implementing the absolute position detection device of a rotating body according to the present disclosure, the second row magnets 200 may have 25 pole pairs, but in the disclosure of the present disclosure, for the convenience of explanation, it is assumed that the second row magnets 200 have 10 pole pairs. That is, in the first exemplary embodiment of the present disclosure, the natural number n is 9.

The first row magnets 100 and the second row magnets 200 described above may be coupled to an auxiliary member having a predetermined shape and may be coupled to the rotation axis of the rotating body to rotate together with the rotation axis.

As shown in FIG. 2, the first Hall sensor 410 is installed adjacent to the first row magnets 100 to detect a change in magnetism according to rotation of the first row magnets 100. The first Hall sensor 410 does not rotate together with the first row magnets 100 and detects a change in magnetism according to the rotation of the first row magnets 100 and outputs a signal. The signal detected by the first Hall sensor 410 appears in the form of a sine wave according to a rotational movement of the pole pairs included in the first row magnets 100.

As shown in FIG. 2, the second Hall sensor 420 is installed adjacent to the second row magnets 200 to detect a change in magnetism according to the rotation of the second row magnets 200. Similar to the first Hall sensor 410, the second fall sensor 420 does not rotate together with the second row magnets 200 and detects a change in magnetism according to the rotation of the second row magnets 200 and outputs a signal. The signal detected by the second Hall sensor 420 also appears in the form of a sine wave according to rotational movement of the pole pairs included in the second row magnets 200.

Although not shown in detail in FIG. 2, the first Hall sensor 410 and the second Hall sensor 420 are installed spaced apart from the first row magnets 100 and the second row magnets 200 in a direction of the rotation axis, respectively, to detect a change in magnetism according to the rotation of the first row magnets 100 and the second row magnets 200. This exemplary embodiment may further include a plate having a surface on which the first Hall sensor 410 and the second Hall sensor 420 are installed, and a circuit for transmitting the signals output from the first Hall sensor 410 and the second Hall sensor 420 may be printed on the plate or an electric wire may be connected to the plate.

However, in the present disclosure, a direction in which the first Hall sensor 410 and the second Hall sensor 420 are installed is not limited to the positions at which the first Hall sensor 410 and the second Hall sensor 420 are spaced apart from the first row magnets 100 and the second row magnets 200 in the direction of the rotation axis, and in an exemplary embodiment, the first Hall sensor 410 may be spaced apart from the first row magnets 100 in the direction of the rotation axis and the second fall sensor 420 may be located in a direction outside of the rotation axis in the second row magnets 200. That is, the first Hall sensor 410 and the second Hall sensor 420 are not limited in installation positions as long as the first Hall sensor 410 and the second Hall sensor 420 are spaced apart from the first row magnets 100 and the second row magnets 200 and are able to detect and output a change in magnetism according to rotation of the first row magnets 100 and the second row magnets 200.

Figure 3:
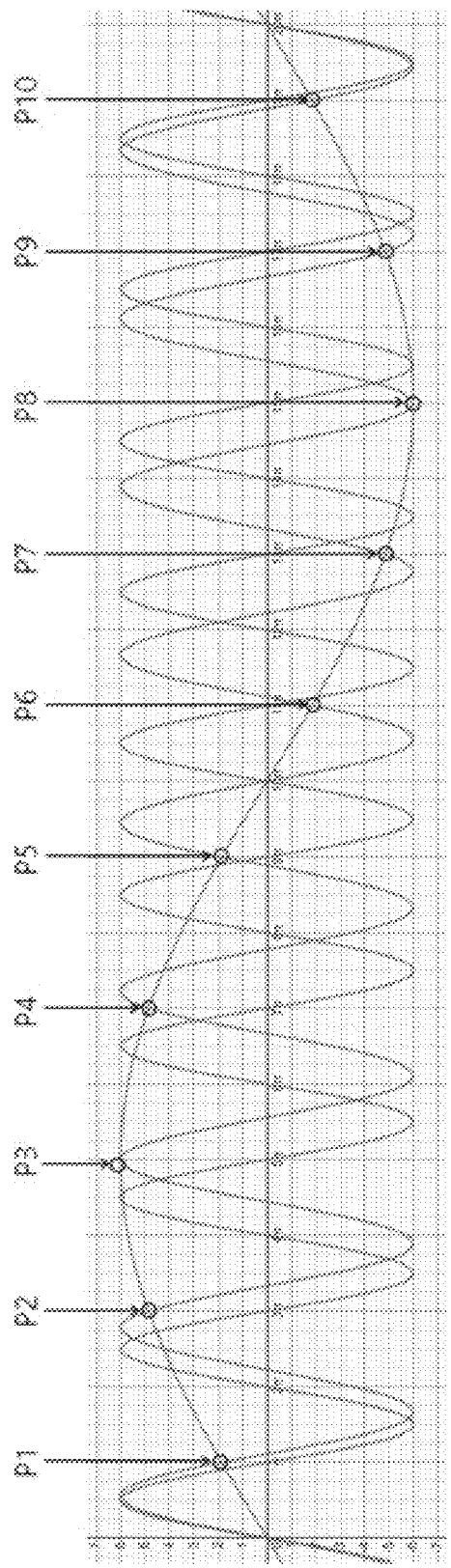
FIG. 3 is a graph of signals output from a first Hall sensor and a second Hall sensor of an absolute position detection device of a rotating body according to the first exemplary embodiment of the present disclosure, and a primary harmonic detected therethrough.

FIG. 3 shows signals output from the first Hall sensor 410 and the second Hall sensor 420 when the first row magnets 100 include 9 pole pairs and the second row magnets 200 includes 10 pole pairs.

Among the signals shown in FIG. 3, a signal output from the first Hall sensor 410 is shown in blue, and a signal output from the second Hall sensor 420 is shown in red. As shown in FIG. 2, when the first row magnets 100 include 9 pole pairs, the signal output from the first Hall sensor 410 represents a sine wave form of a predetermined period, and when the second row magnets 200 include 10 pole pairs, the signal output from the second Hall sensor 420 also represents a sine wave form of a predetermined period, but the period of the signal output from the second Hall sensor 420 is shorter than the period of the signal output from the first Hall sensor 410.

One period of the blue and red signals shown in FIG. 3 occurs when a part of the magnet corresponding to one pole pair passes through the Hall sensor, and when 9 periods of the signal output from the first Hall sensor 410 are repeated (20 pi (Π)), 9 pole pairs have rotated, and thus, it is considered that the rotating body has rotated once, and similarly, when 10 periods of the signal output from the second Hall sensor 420 are repeated (20 pi) 10 polar pairs have rotated, and it is considered that the rotating body has rotated once. Therefore, in the present disclosure, a speed of the rotating body may be measured by measuring how many times the signal output from the first hall sensor 410 is repeatedly output for a predetermined time, and an acceleration of the rotating body may also be measured using the measured speed of the rotating body.

Although not shown in the drawings, the absolute position detection device of a rotating body according to the first exemplary embodiment of the present disclosure may further include a controller. The controller measures an absolute position using the signals detected by each of the first Hall sensor 410 and the second Hall sensor 420. Since the controller is configured for signal processing, it may be implemented as a device or component capable of calculation such as a microprocessor and may be electrically connected with the Hall sensors to receive signals output from the first Hall sensor 410 and the second Hall sensor 420.

A method of measuring the absolute position using the signals output from the first Hall sensor 410 and the second Hall sensor 420 by the controller will be described. Referring to FIG. 3, the controller senses a value output from the first Hall sensor 410 at every predetermined period of a signal output from the second Hall sensor 420. In this exemplary embodiment, the predetermined period may be a zero crossing point at which the signal output from the second Hall sensor 420 changes from positive to negative and may be odd-numbered pi, such as 1 pi, 3 pi, and 5 pi. However, the present disclosure does not limit the predetermined period thereto. Values of the signal output from the first Hall sensor 410 in the odd-numbered pis are indicated by black circles shown in FIG. 2, and when the black circles are connected to each other, a primary harmonic based on a time during which the first row magnets 100 and the second row magnets 200 rotate once as a period appears. In FIG. 3, the primary harmonic is shown in green. For convenience of explanation, the black circles shown in FIG. 3 are referred to intersection points, a total of 10 intersection points (a first intersection point P1 to a tenth intersection point P10) are shown in FIG. 3.

As shown in FIG. 3, the primary harmonic has a period of 20 pi, and the corresponding period is the same as a time taken for the rotating body included in the absolute position detection device of a rotating body according to this exemplary embodiment to rotate once. That is, since the primary harmonic is in the form of a sine wave having a period of 20 pi, the controller may measure an absolute position of the rotating body through the value of the primary harmonic at the time of measurement.

The controller may estimate a primary harmonic using values output from each of the first Hall sensor 410 and the second Hall sensor 420. The period of the primary harmonic using the values output from each of the first Hall sensor 410 and the second Hall sensor 420 is the same as the time taken for the rotating body to rotate once, the time taken for the rotating body to rotate once may be measured using either the first Hall sensor 410 or the second Hall sensor 420, and an amplitude of the primary harmonic does not exceed a maximum value of the signal output from the first Hall sensor 410. Therefore, an overall shape of the primary harmonic may be estimated using the signals output from each of the first and second Hall sensors in a normal section with two different consecutive intersections. Specifically, it is possible to estimate an overall shape of the primary harmonic according to whether two consecutive intersections are positive or negative and whether two consecutive intersections increase or decrease. In this manner, the present disclosure may detect the absolute position of the rotating body even if some of the magnets are broken.

The absolute position detection device of a rotating body having the structure as described above may increase resolution by the two rows of magnets included therein, and since the absolute position of the rotating body may be detected using the primary harmonic, even without an additional device other than the Hall sensors, the absolute position detection device may be applied to various fields.

Second Embodiment

Figure 4:
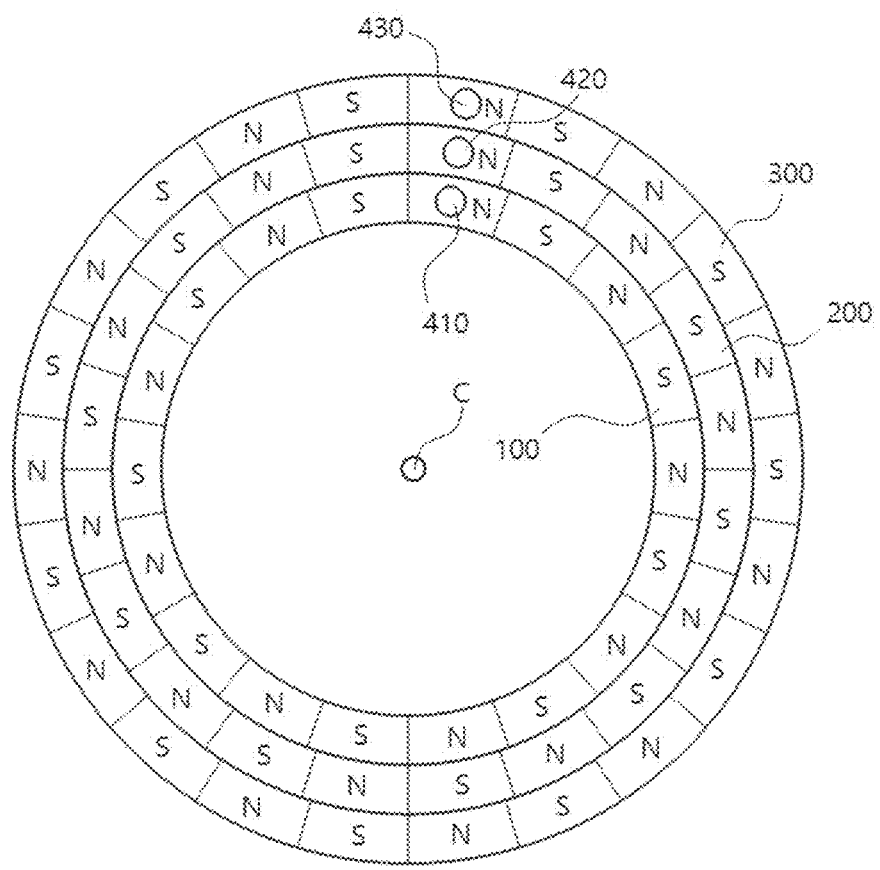
FIG. 4 is a schematic diagram of an absolute position detection device of a rotating body according to a second exemplary embodiment of the present disclosure.

FIG. 4 schematically shows an absolute position detection device of a rotating body according to a second exemplary embodiment of the present disclosure.

As shown in FIG. 4, the absolute position detection device of a rotating body according to the second exemplary embodiment of the present disclosure may further include third row magnets 300 and a third hall sensor 430 in addition to the first row magnets 100 and the second row magnets 200. The third row magnets 300 are installed on the outside of the second row magnets 200 around the rotation axis and have n+2 pole pairs (n is a natural number). In this exemplary embodiment shown in FIG. 4, since the first row magnets 100 have 9 pole pairs, the third row magnets 300 have 11 pole pairs. However, as described above, a general encoder may include magnets having a larger number of pole pairs, and in an exemplary embodiment, the first row magnet may have 24 pole pairs, the second row magnet may have 25 pole pairs, and the third row magnet may have 26 pole pairs.

The third Hall sensor 430 is installed adjacent to the third row magnets 300, detects a change in magnetism according to rotating third row magnets 300, and outputs a corresponding signal. Since the second row magnets 200 and the third row magnets 300 have one pole pair different from each other, the controller may generate a primary harmonic using signals output from the second Hall sensor 420 and the third Hall sensor 430 and may generate another primary harmonic using signals output from the first Hall sensor 410 and the second Hall sensor 420. By comparing the different primary harmonics, the controller may more accurately measure in measuring a rotational speed of the rotating body or detecting an absolute position of the rotating body.

Third Embodiment

Figure 5A:
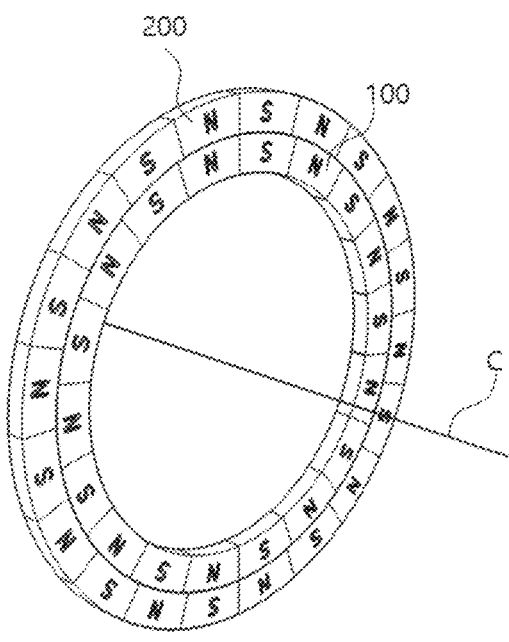
FIGS. 5A and 5B are perspective views of an absolute position detection device of a rotating body according to the first exemplary embodiment of the present disclosure and a perspective view of an absolute position detection device of a rotating body according to a third exemplary embodiment of the present disclosure.
Figure 5B:
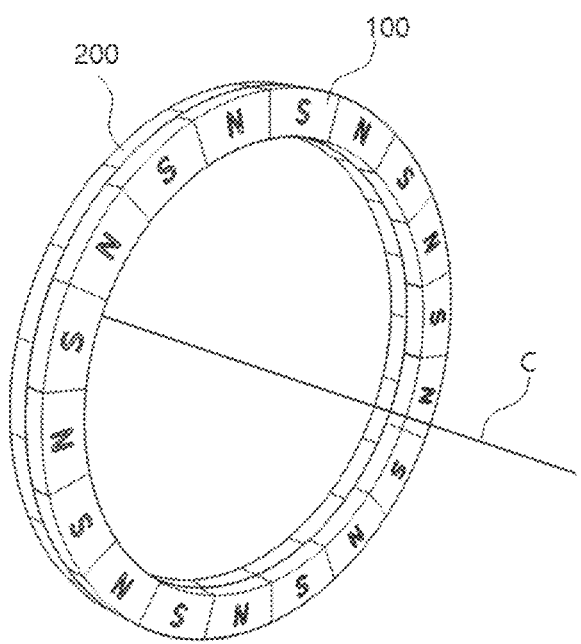

FIG. 5A and FIG. 5B show the absolute position detection device of a rotating body according to the first exemplary embodiment of the present disclosure and the absolute position detection device of a rotating body according to the third exemplary embodiment of the present disclosure.

As shown in FIG. 5A, in the absolute position detection device of A rotating body according to the first exemplary embodiment of the present disclosure, the first row magnets 100 and the second row magnets 200 are successively arranged in the outer circumferential direction around the rotation axis. In contrast, in the absolute position detection device of a rotating body according to the third exemplary embodiment of the present disclosure shown in FIG. 5B, the first row magnets 100 and the second row magnets 200 may have the same diameter and may be arranged successively in a direction of the rotation axis. In this case, the first Hall sensor and the second Hall sensor may be installed on both sides of the first row magnets 100 and the second row magnets 200 in the direction of the rotation axis, respectively, or may be installed in outer circumference direction of the first row magnets 100 and the second row magnets 200 to detect a change in magnetism according to rotation of the magnets.

Hereinafter, an absolute position detection method of a rotating body according to the present disclosure will be described in detail.

The absolute position detection method of a rotating body according to the first exemplary embodiment of the present disclosure may be performed through the absolute position detection device of a rotating body according to the first exemplary embodiment of the present disclosure, and the absolute position detection device of a rotating body may include first row magnets 100, second row magnets 200, a first Hall sensor 410, a second Hall sensor 420, and a controller.

The absolute position detection method of a rotating body according to the first exemplary embodiment of the present disclosure may include operations a) and b).

In operation a), the first Hall sensor 410 detects a change in magnetism according to rotation of the first row magnets having n pole pairs and outputs a signal and the second Hall sensor 420 detects a change in magnetism according to rotation of the second row magnets 200 having n+1 pole pairs and outputs a signal. Operation a) may be performed by the first Hall sensor 410, the second Hall sensor 420, and the controller.

In operation b), the second Hall sensor 420 measures an absolute position of the rotating body by detecting a primary harmonic using a value of the signal output from the first Hall sensor 410 at every predetermined period of the signal output from the second Hall sensor. In particular, in operation b), the absolute position of the rotating body may be measured by estimating a primary harmonic using at least two continuous values among values of the signal output from the first Hall sensor 410 at every predetermined period of the signal output from the second Hall sensor 420.

The absolute position detection method of a rotating body according to the second exemplary embodiment of the present disclosure may be performed through a rotating body enabling detection of an absolute position according to the second exemplary embodiment of the present disclosure shown in FIG. 3 and may include operations a) and b).

In operation a), the first Hall sensor 410 detects a change in magnetism according to rotation of the first row magnets 100 having n pole pairs and outputs a signal, the second Hall sensor 420 detects a change in magnetism according to rotation of the second row magnets 200 having n+1 pole pairs and outputs a signal, and the third Hall sensor 430 detects a change in magnetism according to rotation of the third row magnets 300 having n+2 pole pairs and outputs a signal. Operation a) may be performed by the first Hall sensor 410, the second Hall sensor 420, the third Hall sensor 430, and the controller.

In operation b), an absolute position of the rotating body is measured by detecting a primary harmonic using a value of the signal output from the first fail sensor at every predetermined period of a signal output from the second Hall sensor or by detecting a primary harmonic using a value of the signal output from the second Hall sensor at every predetermined period of the signal output from the third Hall sensor. In particular, in operation b), in measuring the absolute position of the rotating body using two primary harmonics detected to be different, the measured values may be complemented with each other to more accurately measure the absolute position of the rotating body.

According to the absolute position detection device and detection method of a rotating body according to various exemplary embodiments of the present disclosure as described above, not only a rotation speed and an acceleration of the rotating body may be detected using the first row magnets, the second row magnets, the first Hall sensor, and the second Hall sensor but also an angle at which the rotating body has rotated may be detected using the primary harmonic detected due to a difference between pole pairs, and thus, the absolute position detection device and detection method of a rotating body according to the present disclosure may be applied to various fields.

In addition, according to the present disclosure, resolution may be improved by simultaneously using the first row magnets and the second row magnets.

In addition, according to the present disclosure, even if some of the first row magnets and the second row magnets is damaged, a shape of an overall primary harmonic may be estimated using signals output from the first Hall sensor and the second Hall sensor, and thus, an absolute position of the rotating body may be detected even when the magnets are damaged.

The present disclosure is not limited to the exemplary embodiments described above, application ranges are diverse, and various modifications may be made without departing from the scope of the present disclosure as claimed in the claims.

What is claimed is:

1. An absolute position detection device of a rotating body, the absolute position detection device comprising:
   first row magnets coupled to a rotating body to rotate together and having n pole pairs, wherein n is a natural number;
   second row magnets coupled to the rotating body to rotate together and having (n+1) pole pairs;
   a first Hall sensor installed adjacent to the first row magnets, configured to detect a change in magnetism according to rotation of the first row magnets, and output a first signal;
   a second Hall sensor installed adjacent to the second row magnets, configured to detect a change in magnetism according to rotation of the second row magnets, and output a second signal;
   third row magnets coupled to the rotating body to rotate together and having (n+2) pole pairs;
   a third Hall sensor installed adjacent to the third row magnets and configured to detect a change in magnetism according to rotation of the third row magnets; and
   a controller configured to measure an absolute position of the rotating body using the first signal output from the first Hall sensor and the second signal output from the second Hall sensor,
   wherein the controller is further configured to measure the absolute position using signals detected by at least two of the first Hall sensor, the second Hall sensor, or the third Hall sensor.

2. The absolute position detection device of claim 1, wherein the controller is further configured to detect a primary harmonic using a value of the first signal at every predetermined period of the second signal and measure an absolute position of the rotating body according to a value of the primary harmonic.

3. The absolute position detection device of claim 2, wherein the controller is further configured to estimate the primary harmonic using at least two of the values of the first signal at every predetermined period of the second signal to measure the absolute position of the rotating body.

4. The absolute position detection device of claim 1, wherein the controller is further configured to measure the absolute position of the rotating body by detecting a primary harmonic using a value of the first signal at every predetermined period of the second signal and a value of the second signal at every predetermined period of a third signal output from the third Hall sensor.

5. The absolute position detection device of claim 1, wherein the first row magnets and the second row magnets are arranged adjacent to each other in a direction of a rotation axis of the rotating body.

6. The absolute position detection device of claim 1, wherein the first row magnets and the second row magnets are arranged in an outer circumferential direction about a rotation axis of the rotating body.

7. An absolute position detection method of a rotating body using first row magnets, second row magnets, and third row magnets coupled to a rotating body and rotating, the absolute position detection method comprising:
   detecting, by a first Hall sensor, a change in magnetism according to rotation of the first row magnets having n pole pairs and outputting a first signal, wherein n is a natural number;
   detecting, by a second Hall sensor, a change in magnetism according to rotation of the second row magnets having (n+1) pole pairs and outputting a second signal;
   detecting, by a third Hall sensor, a change in magnetism according to rotation of the third row magnets having (n+2) pole pairs and outputting a third signal; and
   measuring an absolute position of the rotating body by detecting a primary harmonic using a value of the first signal output from the first Hall sensor at every predetermined period of the second signal output from the second Hall sensor or by detecting a primary harmonic using a value of the second signal at every predetermined period of the third signal output from the third Hall sensor.

* * * * *